(12) United States Patent
Ziemak et al.

(10) Patent No.: US 11,383,187 B2
(45) Date of Patent: Jul. 12, 2022

(54) SUCTION TUBE FILTER ARRANGEMENT AND FLUID TANK SYSTEM FOR A FLUID TANK

(71) Applicants: Wema System AS, Blomsterdalen (DE); MEAS France, Toulouse (FR)

(72) Inventors: Maciej Ziemak, Kotowice (PL); Girish Chebbi, Radal (NO); Rafael Ferrer Ruiz, Toulouse (FR)

(73) Assignees: MEAS FRANCE, Toulouse (FR); TE CONNECTIVITY NORGE AS, Blomsterdalen (NO)

( * ) Notice: Subject to any disclaimer, the term of this patent is extended or adjusted under 35 U.S.C. 154(b) by 116 days.

(21) Appl. No.: 16/749,353

(22) Filed: Jan. 22, 2020

(65) Prior Publication Data

US 2020/0230532 A1 Jul. 23, 2020

(30) Foreign Application Priority Data

Jan. 23, 2019 (EP) .................................. 19305089

(51) Int. Cl.
| | |
|---|---|
| *B01D 35/027* | (2006.01) |
| *B01D 35/18* | (2006.01) |
| *B01D 39/08* | (2006.01) |
| *F01N 3/20* | (2006.01) |

(52) U.S. Cl.
CPC .......... *B01D 35/027* (2013.01); *B01D 35/18* (2013.01); *B01D 39/08* (2013.01); *F01N 3/2066* (2013.01); *B01D 2201/204* (2013.01); *F01N 2610/02* (2013.01); *F01N 2610/10* (2013.01); *F01N 2610/1406* (2013.01); *F01N 2610/1426* (2013.01)

(58) Field of Classification Search
CPC combination set(s) only.
See application file for complete search history.

(56) References Cited

U.S. PATENT DOCUMENTS

| | | | |
|---|---|---|---|
| 4,411,788 A | 10/1983 | Kimura | |
| 5,409,608 A | 4/1995 | Yoshida et al. | |
| 5,776,341 A | 7/1998 | Barnard et al. | |
| 6,488,846 B1 | 12/2002 | Marangi | |
| 9,732,653 B2 * | 8/2017 | Ogawa | F01N 3/2896 |
| 2014/0331650 A1 * | 11/2014 | Yang | B01D 53/9495 60/277 |
| 2015/0023843 A1 * | 1/2015 | Driscoll | F01N 3/208 422/168 |
| 2015/0198071 A1 * | 7/2015 | Hudgens | B01D 35/0276 210/805 |
| 2015/0218990 A1 * | 8/2015 | Hudgens | F01N 11/00 423/239.1 |

(Continued)

FOREIGN PATENT DOCUMENTS

EP 1925354 A1 5/2008

OTHER PUBLICATIONS

European Communication, European Application No. 19305089.5-1104, European Date, dated Jun. 23, 2021.

(Continued)

*Primary Examiner* — Binh Q Tran

(57) ABSTRACT

A suction tube filter arrangement includes a suction tube defining a suction tube direction and a filter member extending along the suction tube direction. The suction tube is at least partially arranged inside the filter member.

18 Claims, 3 Drawing Sheets

(56) References Cited

U.S. PATENT DOCUMENTS

2016/0193553 A1* 7/2016 Qureshi ................. B01D 29/27
                                                210/314
2017/0122170 A1* 5/2017 Fahrenkrug ........ B01D 35/0276
2017/0189837 A1    7/2017 Herold et al.

OTHER PUBLICATIONS

European Communication, European Application No. 19305089.5-1104, European Date, dated Aug. 31, 2021.

* cited by examiner

SUCTION TUBE FILTER ARRANGEMENT AND FLUID TANK SYSTEM FOR A FLUID TANK

CROSS-REFERENCE TO RELATED APPLICATION

This application claims the benefit of the filing date under 35 U.S.C. § 119(a)-(d) of European Patent Application No. 19305089, filed on Jan. 23, 2019.

FIELD OF THE INVENTION

The present invention relates to a suction tube and, more particularly, to a filter arrangement of a suction tube.

BACKGROUND

Suction tubes are used for the suction of fluid from a fluid tank. In order to prevent debris and/or frozen solution from entering the suction tube, a suction tube may have a filter member that allows only solution to enter the suction tube. Generally, a filter member is arranged at a lower end of the suction tube in order to protect an inlet opening of the suction tube.

In known arrangements, gas bubbles from inside the filter member may enter the suction tube together with solution and, further, the known arrangements are often costly to produce and/or to service.

SUMMARY

A suction tube filter arrangement includes a suction tube defining a suction tube direction and a filter member extending along the suction tube direction. The suction tube is at least partially arranged inside the filter member.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
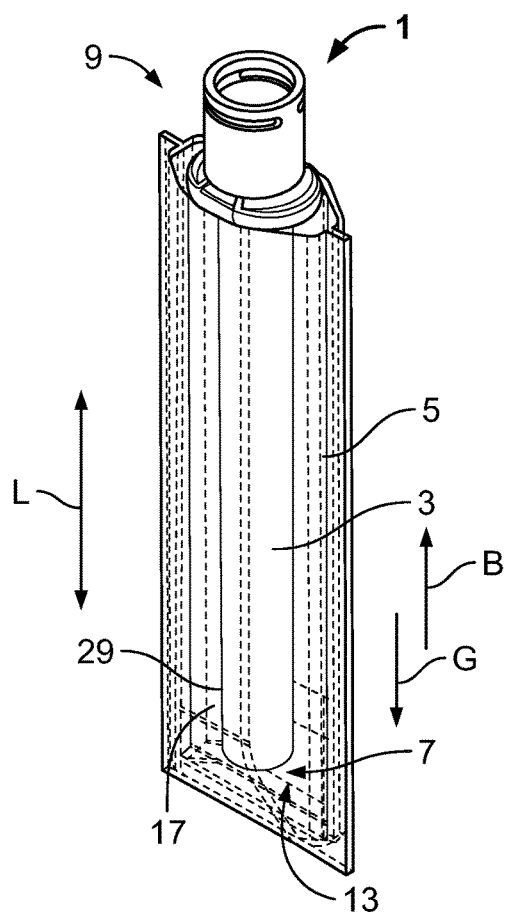
FIG. 1 is a perspective view of a suction tube filter arrangement according to an embodiment.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will convey the concept of the invention to those skilled in the art.

Figure 2:
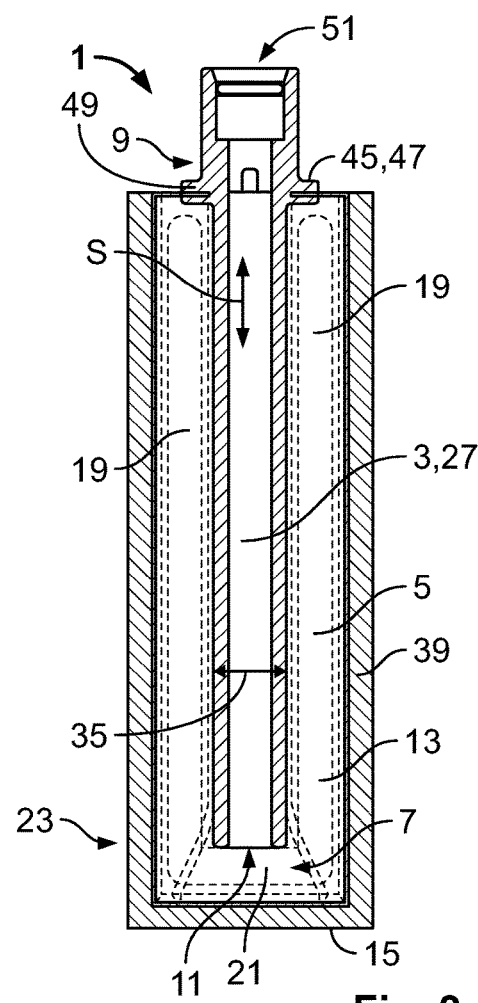
FIG. 2 is a sectional front view of the suction tube filter arrangement of FIG. 1.
Figure 3:
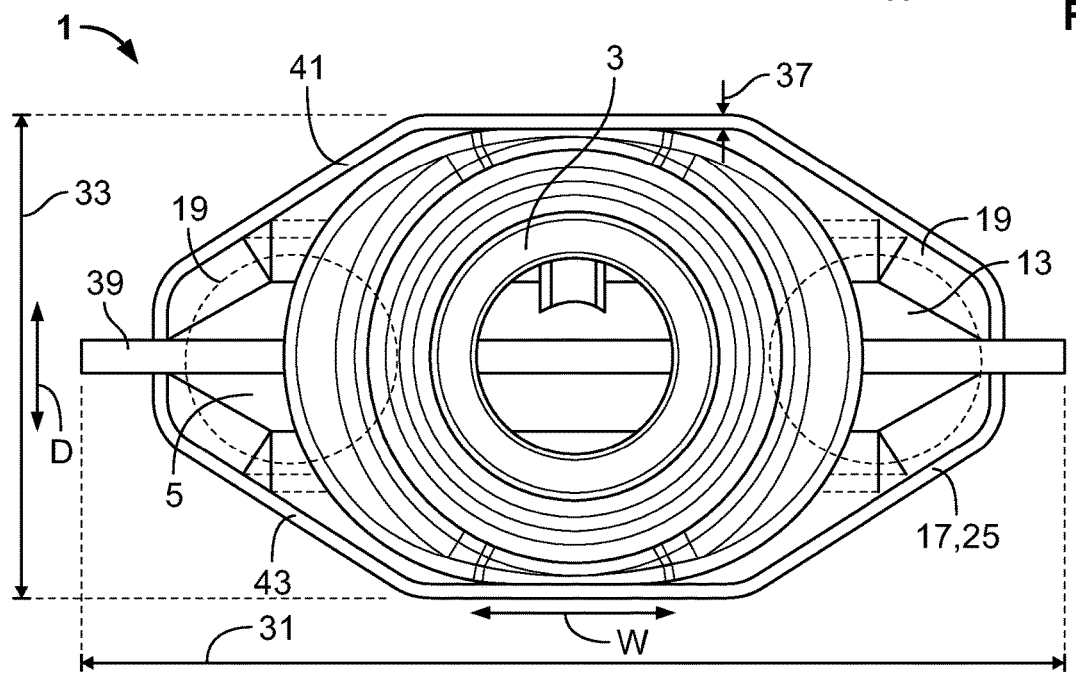
FIG. 3 is a top view of the suction tube filter arrangement of FIG. 1.

A suction tube filter arrangement 1, also referred to as "arrangement 1" herein, according to an embodiment is shown in FIGS. 1-3. The arrangement 1 comprises a suction tube 3 and a filter member 5. The suction tube 3 is used for the suction of a solution from a tank (not shown). The filter member 5 prevents debris and/or frozen solutions from entering the suction tube 3.

Both the suction tube 3 and the filter member 5 have overall elongated shapes, as shown in FIGS. 1-3. The suction tube 3 defines a suction tube direction S. The suction tube direction S extends along a longitudinal direction L of the arrangement 1. The filter member 5 extends along the suction tube direction S and parallel with the longitudinal direction L of the arrangement. When the arrangement 1 is arranged inside a fluid tank system, the longitudinal direction L of the arrangement 1 is aligned parallel with a gas bubble ascension direction B that is parallel with the gravitational direction G but oriented in the opposing direction. The gas bubble ascension direction B is the direction along which gas bubbles may ascend from the solution in the tank.

The suction tube 3 is largely arranged inside the filter member 5, as shown in FIGS. 1-3; a greater part of the suction tube 3 is arranged inside the filter member 5 such that it is surrounded by the filter member 5.

The suction tube 3 has a suction end 7 and a connection end 9, as shown in FIGS. 1 and 2; the ends 7 and 9 are arranged opposing each other along the suction tube direction S. In an embodiment, the suction end 7 forms a lower end of the suction tube 3 and the connection end 9 forms an upper end of the suction tube 3. At the suction end 7, the suction tube 3 has an inlet opening 11 which opens the suction tube 3 to its surrounding and which allows a solution to enter the suction tube 3. The inlet opening 11 is arranged inside the filter member 5.

As shown in FIGS. 1-3, an inner volume 13 extends inside the filter member 5 and is basically arranged between the suction tube 3 and a material of the filter member 5. The inner volume 13 is in fluid communication with the inlet opening 11 of the suction tube 3. The inner volume 13 extends between the suction end 7 and a lower end 15 of the filter member 5. The lower end 15 is an end of the filter member 5 arranged along the longitudinal direction L closer to the suction end 7 than to the connection end 9 of the suction tube 3.

As shown in FIGS. 1 and 2, the inner volume 13 further extends parallel to the longitudinal direction L through the filter member 5 adjacent to the suction tube 3. The inner volume 13 extends along the greater part of a length of the filter member 5 along the longitudinal direction L. Thereby, most of a material 17 of the filter can be used by a solution to enter the inner volume 13 through the filter member 5 and reach the inlet opening 11 of the suction tube 3.

In the shown embodiment, the inner volume 13, indicated by the dashed line in FIG. 2, has a pair of vertical strands 19 which longitudinally extend parallel to the longitudinal direction L, and a horizontal strand 21 which is closest to the inlet opening 11. The vertical strands 19 and the horizontal strand 21 basically form a U-shaped structured inner volume 13. The inlet opening 11 is arranged at a bottom 23 of the filter member 5. The bottom 23 is located at the lower end 15 of the filter member 5.

The inner volume 13 has the benefit that the bulk of the material 17 can be used for a solution to enter the filter member 5 and to flow through the inner volume 13 towards and into the inlet opening 11. Thereby, the effective area that is used for a solution to pass the filter member 5 is increased in comparison to a filter member 5 that covers only the inlet opening 11. The vertical strands 19 may allow gas bubbles in the solution inside the inner volume 13 to ascend along the gas bubble ascension direction B along the vertical strands 19 and away from the inlet opening 11. Thereby, the suction of gas bubbles into the suction tube 3 may be prevented. The elongated shapes of the suction tube 3 and filter member 5 increase the tendency of gas bubbles to ascend inside the filter member 5 away from the inlet opening 11 of the suction tube 3. Furthermore, the elongated shape of the filter member 5 may provide a large surface which the solution may pass to the suction tube 3. Thereby, a flow rate of the solution may be increased. The inlet opening 11 of the suction tube 3, in an embodiment, is arranged inside the filter member 5.

The filter member 5 without the suction tube 3 may be an overall flat body, as shown in FIGS. 1-3. The material 17 of the filter member 5 is a fabric 25 in an embodiment, such as a woven material. In another embodiment, the filter member 5 is made from a woven fiber structure. The suction tube 3 serves as a support structure 27 for the filter member 5. In other words, the suction tube 3 may expand the material 17 of the filter member 5, thereby defining the structure of the filter member 5 and the outer shape of the arrangement 1.

In a cross-section perpendicular to the longitudinal direction L, as shown in FIG. 3, the filter member 5 may be expanded to an overall lens-shape. Thereby, a pair of opposing sections 29 of the suction tube 3 abut the material 17 of the filter member 5, expanding the filter member 5 along a depth direction D. Perpendicular to the depth direction D and the longitudinal direction L, the filter member 5 extends along a width direction W. A width 31 of the filter member 5, measured along the width direction W, is larger than a depth 33 of the filter member 5, measured along the depth direction D. Because the suction tube 3 expands the filter member 5 parallel with the depth direction D, the depth 33 is composed of an outer diameter 35 of the suction tube 3 and two times a material thickness 37 of the material 17. Due to the width 31 being larger than the depth D, the lateral strands 19 of the inner volume 13 are opened up inside the filter member 5.

The filter member 5 has a seam 39, as shown in FIGS. 2 and 3. The seam 39 joins at least two parts 41, 43 of the filter material 17 in order to form the filter member 5. The parts 41 and 43 are two halves of a single piece of fabric. The piece of fabric may be folded in order to form the filter member 5. The seam 39 forms the margin of the filter member 5, at least at the lower end 15 and at the two sides which are opposed to each other along the width direction W.

The above-described arrangement, in which the suction tube 3 itself forms a support structure 27 for the filter member 5, is only an embodiment. In another embodiment, the filter member 5 could also be pre-shaped in order to receive the suction tube 3. In another embodiment, the suction tube 3 could be provided with an additional support structure in order to define the shape of the filter member 5; the additional support structure could in particular be monolithically formed with the suction tube 3. As another alternative, the filter member 5 could be provided with an inner support structure, for example made from plastic, said support structure expanding the filter member 5 to a required shape.

In order to fixate the filter member 5 on the suction tube 3, the suction tube 3 has at least one fixation device 45, to which the filter member 5 can be undetachably fixated as shown in FIG. 2. In an embodiment, the fixation device 45 is formed monolithically with the remaining suction tube 3. In an embodiment, the fixation device 45 is shaped as a flange 47. The flange 47 may be provided with a circumferential groove 49 into which material 17 of the filter member 5 can be inserted to fixate the filter member 5 on the suction tube 3. The fixation device 45 is arranged at the connection end 9 of the suction tube 3.

The suction tube 3, as shown in FIG. 2, has at least one connection port 51. The connection port 51 can be used for connecting the arrangement 1 with a counter connection port of a fluid tank system. The connection port 51 is adapted for establishing a fluid communication between the suction tube 3 and further parts of a fluid tank system, in particular a fluid pump. The connection port 51 may further mechanically mount the arrangement 1 in the fluid tank system.

The suction tube 3 is made from plastic material in an embodiment. If the suction tube 3 has a fixation device 45 for the filter member 5 and/or with a connection port 51, these features are formed integrally with the remaining suction tube 3 in an embodiment. In other words, the suction tube 3, the fixation device 45, and/or the connection port 51 may be monolithically formed from plastic.

Figures 4, 5:
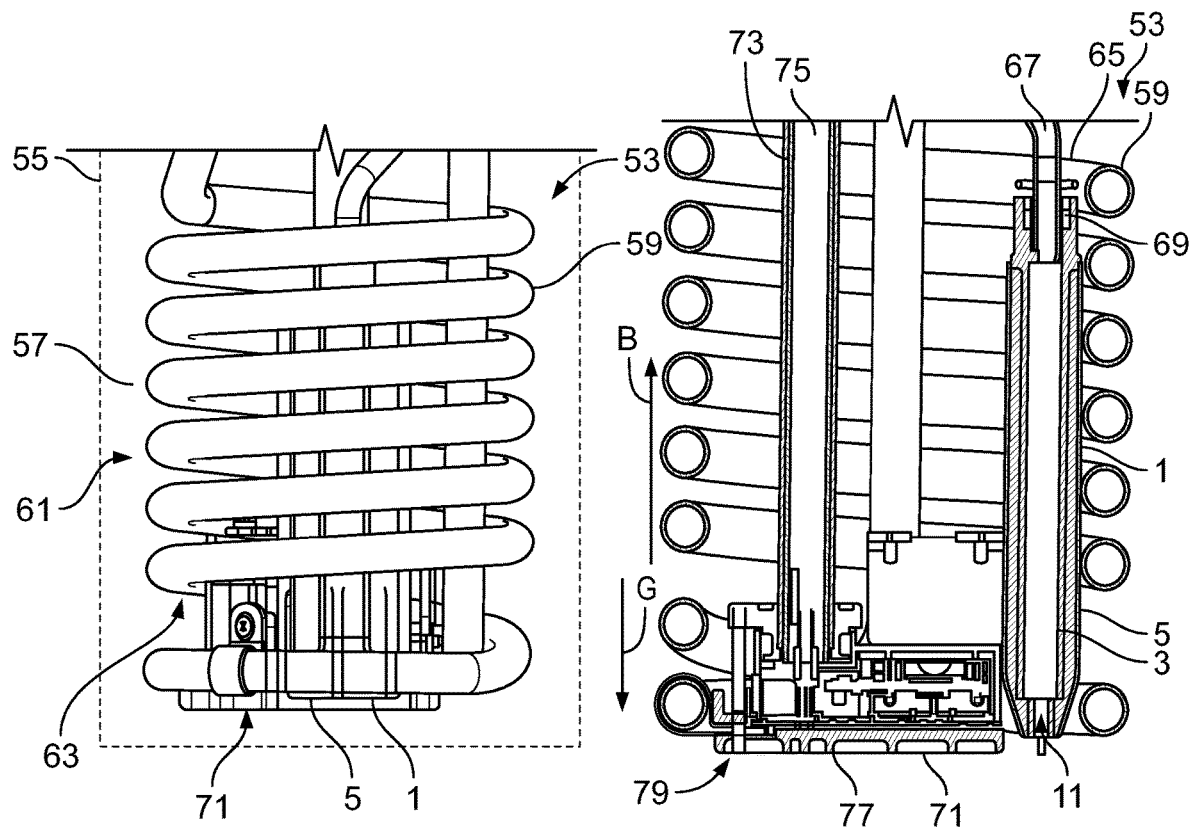
FIG. 4 is a side view of a fluid tank system according to an embodiment.
FIG. 5 is a sectional side view of the fluid tank system of FIG. 4.
Figure 6:
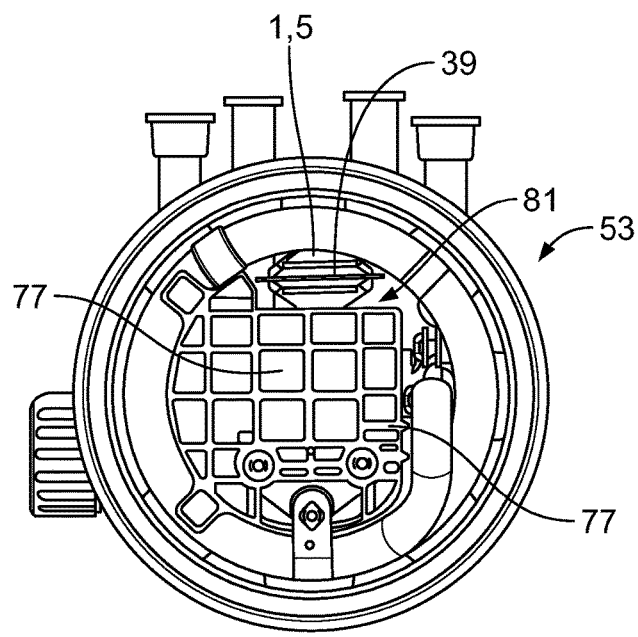
FIG. 6 is a top view of the fluid tank system of FIG. 4.
Figure 7:
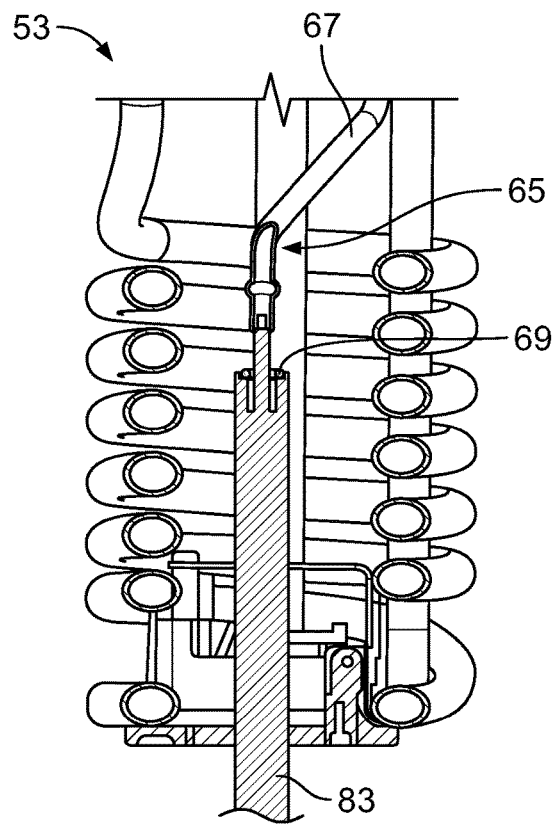
FIG. 7 is a sectional side view of a first step of an installation of a sealing ring on a system sided suction tube of the fluid tank system of FIG. 4.

A fluid tank system 53 according to an embodiment is shown in FIGS. 4-6. FIG. 4 shows a side view of the system 53, FIG. 5 shows a cut through the system 53 showing an interior, and FIG. 6 shows a view of the system 53 from below the system 53. The fluid tank system 53 includes the arrangement 1 as described above with respect to FIGS. 1-3.

The fluid tank system 53 may be arranged inside a fluid tank 55, in particular a fluid tank 55 for a urea solution 57. The urea solution 57 may be used for cleaning diesel exhaust fumes. A fluid tank 55 is only indicated by a dashed line in FIG. 4.

The fluid tank system 53, as shown in FIGS. 4-6, comprises a heating coil 59 and the arrangement 1 described above. The heating coil 59 is intended to heat a solution 57 inside a tank 55 to a working temperature. In particular, the heating coil 59 may be used for melting a frozen solution 57. The heating coil 53 is arranged in a helical structure 61 in an embodiment, the helical structure 61 surrounding a space 63.

In the space 63 that is surrounded by the heating coil 59, as shown in FIG. 4, at least the bulk of the arrangement 1 is located. When the solution 57, which is arranged inside the space 63, is frozen, it is generally heated up earlier than the solution outside the heating coil 59. Consequently, the solution 57 can enter the filter member 5 and thereby the inlet opening 11 of the suction tube 3 even when there is still frozen solution 57 present in the tank 55. This is advantageous over systems in which a suction tube extends outside the heating coil 59 and wherein the inlet opening of the suction tube is arranged elsewhere in the tank.

A length of the arrangement 1 may be adjustable in order to meet different filter specifications. In other words, the length of the suction tube 3 and/or the filter member 5 may be chosen depending on the intended application. In an embodiment, the fluid tank system 53 can be used with a set of interchangeable arrangements 1 each having a different length.

The solution 57 can be pumped from the tank 55 even when there is still frozen solution present in the tank 55. The invention, in an embodiment, is used for tanks containing diesel exhaust fluid (DEF) for cleaning diesel exhaust emissions. The suction tube 3 may be a part of a DEF-dosing system; the fluid tank system 53 according to the invention may be such a DEF-dosing system or a part thereof. The arrangement 1 may also be used in fluid tank systems 53, in particular in DEF-dosing systems without a heating coil. This may for example be the case in regions where there is no risk of freezing the solution.

The inlet opening 11 of the suction tube 3 is arranged inside the space 63, as shown in FIGS. 4 and 5. The filter member 5 and the suction tube 3 extend basically parallel to the gas bubble ascension direction B, as described above.

In order to fixate the arrangement 1 to the system 53, the system 53 has a counter connection port 65 as shown in FIG. 5. The counter connection port 65 may be the end of a system-sided suction tube 67 which may be connected to a pump (not shown). The system-sided suction tube 67 is made from steel in an embodiment. A sealing ring 69 may be present on an outside of the system-sided suction tube 67. When the arrangement 1 is installed in the system 53, the sealing ring 69 is arranged inside the connection port 51, thereby forming a gas-tight connection between the suction tube 3 and the system-sided suction tube 67.

As shown in FIGS. 4-6, the fluid tank system 53 comprises at least one fluid sensor arrangement 71. The fluid sensor arrangement 71 has a quality sensor and/or a liquid level sensor. The fluid sensor arrangement 71 is arranged at the lower end of a sensor tube 73 which mounts the sensor arrangement 71 and which provides an inner space 75 for power and/or data lines for the sensor arrangement 71. The suction tube filter arrangement 1 is arranged side-by-side to the fluid sensor arrangement 71 in an embodiment; thereby, the properties measured by the sensor arrangement 71 reflect the properties of the solution 57 entering the filter member 5 and thereby the suction tube 3.

The sensor arrangement 71 has a bottom plate 77 onto which sensor components are mounted, as shown in FIGS. 5 and 6. The bottom plate 77 is arranged at a lower side 79 of the system 53. The term "lower side" refers to the side of the system 53 that is aligned towards the gravitational direction G. The bottom plate 77 closes the space 63. The bottom plate 77 has a cutout 81 for the arrangement 1. The lower end 15 of the filter member 5 may be arranged in the cutout 81. Due to this arrangement, the inlet opening 11 is basically on a level with the sensor arrangement 71 along the suction tube direction S.

Mounting of a sealing ring 69 onto the system-sided suction tube 67, in particular onto the counter connection port 65, will now be described with reference to FIGS. 7-10.

The fluid tank system 53, as shown in FIGS. 7-10, comprises a jig 83 for mounting a sealing ring 69 on the system-sided suction tube 67. The jig 83 may be provided with an insertion portion 85 for insertion into the system-sided suction tube 67. By inserting the insertion portion 85 into the tube 67, the jig 83 is pre-aligned. During further insertion of the insertion portion 85, the tube 67 is guided into a receiving groove 87 of the jig 83 which circumferentially surrounds the insertion portion 85.

Figure 8:
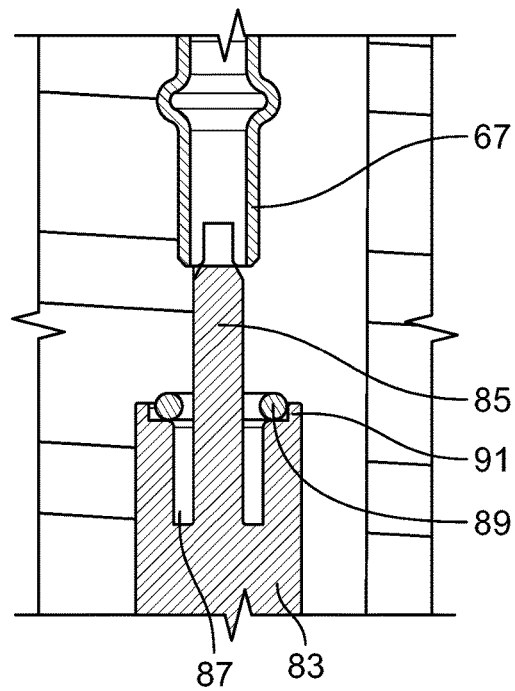
FIG. 8 is a detailed sectional side view of a portion of FIG. 7.

The receiving groove 87 itself is circumferentially surrounded by a sealing ring holding ridge 89 onto which a sealing ring 69 may be placed, as shown in FIG. 8. In order to prevent the sealing ring 69 from moving during mounting of the same, the sealing ring holding ridge 89 is bordered by a holding ring 91.

Figure 9:
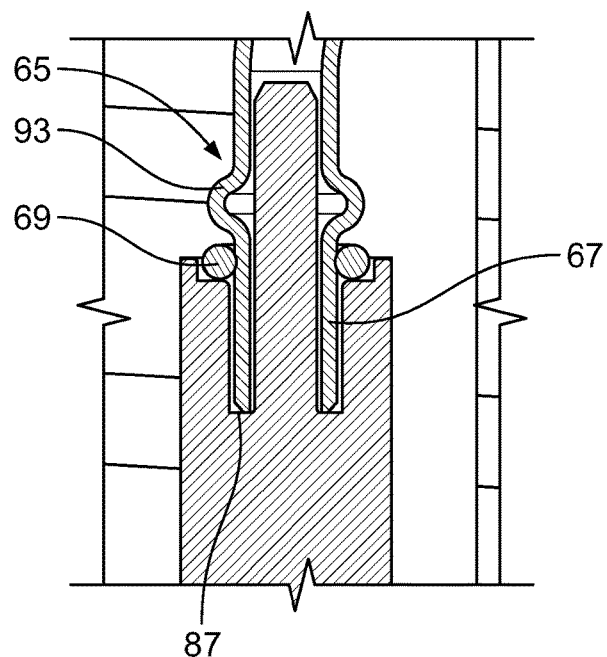
FIG. 9 is a detailed sectional side view of a second step of the installation of the sealing ring.

When the tube 67 enters the receiving groove 87, as shown in FIG. 9, the sealing ring 69 is placed on the tube 67. The depth of the groove 87 may define the position of the sealing ring 69 on the tube 67 in the longitudinal direction of the tube 67.

Figure 10:
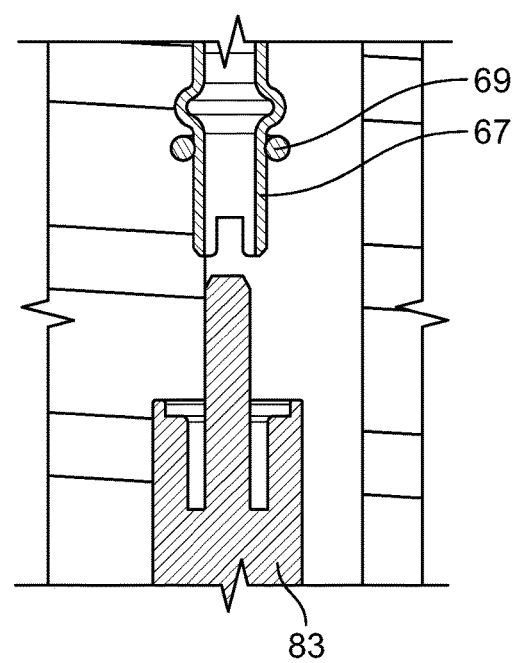
FIG. 10 is a detailed sectional side view of a third step of the installation of the sealing ring.

The tube 67, as shown in FIG. 9, has a bulge 93 that extends circumferentially around the tube 67, forming a flange-like shape. The bulge 93 can be used for mounting the suction tube filter arrangement 1 on the system-sided suction tube 67. The bulge 93 forms a part of the counter connection port 65. The bulge 93 may also be used for defining the position of the sealing ring 69. When the sealing ring 69 has reached its final position, the jig 83 may be removed as shown in FIG. 10. The sealing thing 69 will stay on its position on the tube 67. Afterwards, the suction tube filter arrangement 1 can be connected on the system-sided suction tube 67.

What is claimed is:

1. A suction tube filter arrangement, comprising:
a suction tube defining a suction tube direction; and
a filter member extending along the suction tube direction, the suction tube is at least partially arranged inside the filter member, the suction tube forms a support structure for the filter member.

2. The suction tube filter arrangement of claim 1, wherein the suction tube has a fixation device monolithically formed with the suction tube, the fixation device undetachably fixes the filter member on the suction tube.

3. The suction tube filter arrangement of claim 2, wherein the fixation device is a flange on the suction tube.

4. The suction tube filter arrangement of claim 1, wherein the suction tube has a connection port for connection with a counter connection port of a fluid tank system.

5. The suction tube filter arrangement of claim 1, wherein the suction tube is a plastic material.

6. The suction tube filter arrangement of claim 1, wherein the filter member is a fabric material.

7. The suction tube filter arrangement of claim 1, wherein the suction tube has an inlet opening arranged at a bottom of the filter member.

8. A fluid tank system, comprising:
a heating coil; and
a suction tube filter arrangement including a suction tube defining a suction tube direction and a filter member extending along the suction tube direction, the suction tube is at least partially arranged inside the filter member, the suction tube and the filter member are surrounded by the heating coil.

9. The fluid tank system of claim 8, wherein the heating coil and the suction tube filter arrangement are disposed in a urea solution.

10. The fluid tank system of claim 8, wherein the suction tube has an inlet opening surrounded by the heating coil.

11. The fluid tank system of claim 8, wherein the filter member extends parallel with a gas bubble ascension direction.

12. The fluid tank system of claim 8, further comprising a counter connection port to which the suction tube filter arrangement can be undetachably connected.

13. The fluid tank system of claim 8, further comprising a fluid sensor arrangement, the suction tube filter arrangement is arranged side-by-side with the fluid sensor arrangement.

14. The fluid tank system of claim 13, wherein the fluid sensor arrangement has a bottom plate enclosing a space surrounded by the heating coil.

15. The fluid tank system of claim 14, wherein the bottom plate has a cutout for the suction tube filter arrangement.

16. The fluid tank system of claim 8, further comprising a set of interchangeable suction tube filter arrangements each having a different length.

17. The suction tube filter arrangement of claim 1, wherein the filter member is a flat body that is expanded by the suction tube.

18. The suction tube filter arrangement of claim 17, wherein the filter member has a lens-shaped cross section perpendicular to the suction tube direction.

\* \* \* \* \*